United States Patent
Smedresman et al.

(10) Patent No.: US 10,480,572 B2
(45) Date of Patent: Nov. 19, 2019

(54) BEARING CENTERING SPRING AND DAMPER

(71) Applicant: United Technologies Corporation, Farmington, CT (US)

(72) Inventors: Adam G. Smedresman, West Hartford, CT (US); Sean P. McGee, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/041,041

(22) Filed: Jul. 20, 2018

(65) Prior Publication Data

US 2019/0323555 A1 Oct. 24, 2019

Related U.S. Application Data

(63) Continuation-in-part of application No. 15/956,007, filed on Apr. 18, 2018.

(51) Int. Cl.
*F16C 27/04* (2006.01)
*F16C 33/66* (2006.01)
(Continued)

(52) U.S. Cl.
CPC ............ *F16C 27/045* (2013.01); *F16C 33/66* (2013.01); *F04D 29/283* (2013.01); *F16C 19/28* (2013.01); *F16C 2360/23* (2013.01)

(58) Field of Classification Search
CPC .... F16C 19/36; F16C 27/045; F16C 2360/23; F01D 25/164; F05D 2240/50
See application file for complete search history.

(56) References Cited

U.S. PATENT DOCUMENTS

| 3,097,895 A | * | 7/1963 | Matt | F01D 25/164 384/215 |
| 4,329,000 A | * | 5/1982 | Keske | F01D 25/16 384/464 |

(Continued)

FOREIGN PATENT DOCUMENTS

EP    1167788 A1    1/2002

OTHER PUBLICATIONS

Bugra H. Ertas et al., Synchronous Response to Rotor Imbalance Using a Damped Gas Bearing, J. Eng. Gas Turbines Power, 132(3), 032501, Dec. 1, 2009, The American Society of Mechanical Engineers, New York, NY.

(Continued)

*Primary Examiner* — Phillip A Johnson
(74) *Attorney, Agent, or Firm* — Bachman & LaPointe, P.C.

(57) ABSTRACT

A machine has a first member, a second member, a bearing, and a spring. The bearing inner race is mounted to the second member. A spring first end portion is mounted to the first member. The bearing outer race is mounted to a spring second end portion. The spring has a flexible portion between the first end portion and the second end portion. A first annular seal is carried by an outer diameter first groove in an outer diameter surface of the second end portion and seals with an inner diameter surface of a sealing portion of the first member. A second annular seal carried by an inner diameter second groove in the first member and seals with an outer diameter surface of the second end portion. A fluid outlet in the first member opens to a chamber between the first annular seal and the second annular seal.

18 Claims, 7 Drawing Sheets

(51) Int. Cl.
  *F04D 29/28* (2006.01)
  *F16C 19/28* (2006.01)

(56) References Cited

U.S. PATENT DOCUMENTS

| | | | | |
|---|---|---|---|---|
| 4,429,923 | A | * | 2/1984 | White .................. F01D 25/164 384/99 |
| 4,884,903 | A | | 12/1989 | Pham et al. |
| 5,169,240 | A | | 12/1992 | Bobo et al. |
| 5,251,985 | A | | 10/1993 | Monzel |
| 6,325,546 | B1 | * | 12/2001 | Storace .................. F01D 21/04 384/536 |
| 6,695,478 | B2 | * | 2/2004 | Bos ....................... F01D 25/164 384/99 |
| 7,040,811 | B2 | * | 5/2006 | Dusserre-Telmon ........................ F16C 27/045 384/475 |
| 8,182,153 | B2 | | 5/2012 | Singh et al. |
| 8,342,796 | B2 | | 1/2013 | Spencer et al. |
| 8,727,699 | B2 | | 5/2014 | Vetters et al. |
| 8,747,054 | B2 | | 6/2014 | Witlicki |
| 8,834,095 | B2 | | 9/2014 | Davis |
| 9,464,669 | B2 | | 10/2016 | Kerr et al. |
| 9,488,071 | B2 | | 11/2016 | Anglin et al. |
| 9,599,152 | B2 | | 3/2017 | Freeman et al. |
| 9,702,404 | B2 | | 7/2017 | Smedresman et al. |
| 9,714,584 | B2 | | 7/2017 | Morris |
| 9,752,616 | B2 | * | 9/2017 | Saadi ...................... F01D 25/16 |
| 9,790,863 | B2 | | 10/2017 | O'Brien |
| 9,841,056 | B2 | | 12/2017 | Snow et al. |
| 9,879,720 | B2 | | 1/2018 | Ertas et al. |
| 9,926,975 | B2 | | 3/2018 | Smedresman et al. |
| 2002/0076124 | A1 | | 6/2002 | Bos et al. |
| 2009/0263058 | A1 | | 10/2009 | Gibbons |
| 2009/0269185 | A1 | | 10/2009 | Spencer et al. |
| 2013/0156574 | A1 | | 6/2013 | Antunes et al. |
| 2015/0240867 | A1 | | 8/2015 | Amador et al. |
| 2016/0186607 | A1 | | 6/2016 | Witlicki et al. |
| 2016/0327098 | A1 | * | 11/2016 | Long, Jr. ............... F01D 25/164 |
| 2017/0122369 | A1 | | 5/2017 | Smedresman et al. |

OTHER PUBLICATIONS

U.S. Office Action dated Apr. 15, 2019 for U.S. Appl. No. 15/956,007.
European Search Report dated Sep. 13, 2019 for European Patent Application No. 19170187.9.

\* cited by examiner

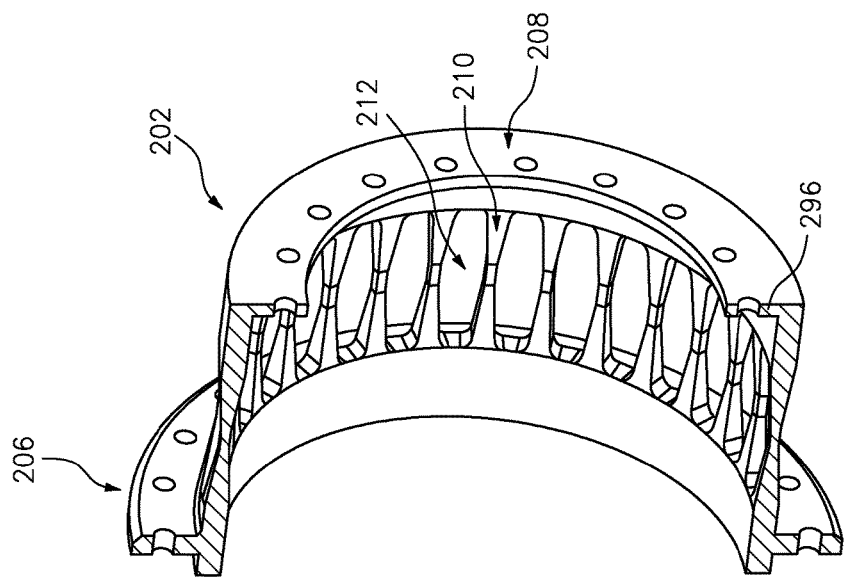
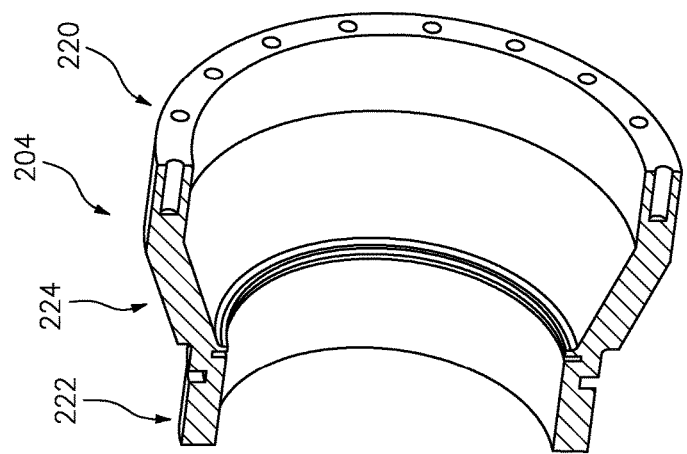

BEARING CENTERING SPRING AND DAMPER

CROSS-REFERENCE TO RELATED APPLICATION

This is a continuation-in-part of U.S. patent application Ser. No. 15/956,007 (the '007 application), filed Apr. 18, 2018, and entitled "Bearing Centering Spring and Damper", the disclosure of which is incorporated by reference herein in its entirety as if set forth at length.

BACKGROUND

The disclosure relates to turbomachine bearings. More particularly, the disclosure relates to turbomachine bearing centering spring/damper systems.

Turbomachines, namely, gas turbine engines (broadly inclusive of turbofans, turbojets, turboprops, turboshafts, industrial gas turbines, and the like) have numerous rolling element (ball or roller) bearing systems intervening between one or more spools and static or fixed structure (e.g., the engine case). Various spring mounting/retaining systems exist such as to accommodate tolerance of the rotating components, vibration, inertial loading due to aircraft maneuvering, and the like. The spring action may be damped by a fluidic damper (e.g. a "squeeze-film" damper which may use bearing lubrication oil as the fluid). One genus of these systems involve springs which are often referred to as "squirrel cage" springs due to their geometry. In addition to the radial spring action, depending on implementation the spring may serve to axially position the associated bearing race.

One example of a squirrel cage retainer is disclosed in U.S. Pat. No. 9,464,669 (the '669 patent) of Kerr et al., Oct. 11, 2016, the disclosure of which is incorporated by reference in its entirety herein as if set forth at length. The term "squirrel cage" relates somewhat to the hamster wheel like appearance of the spring/retainer with two full annulus end portions separated by a center portion having a circumferential array of longitudinal beams or legs joining the two end portions and separated by gaps. The circumferential array of legs and gaps provides flexibility at a desired spring rate allowing excursions of the two end portions off their coaxial condition. In the '669 patent configuration, one of the ends (the proximal end and, in the example, forward end) comprises a mounting flange for mounting to the associated structure (e.g., static structure in that example). The opposite second end portion has features for bearing engagement and fluid damping. Specifically, the inner diameter (ID) surface of the second end portion is dimensioned to receive the outer diameter (OD) surface of the associated bearing outer race. The ID surface face may bear features for also axially retain/engaging the outer race.

The OD surface of the second portion bears two annular grooves. The grooves each carry a seal (e.g., a ring seal such as a piston ring seal (e.g., metallic), an elastomeric O-ring seal, spring-loaded carbon seal, or the like). The second portion is mounted in close sliding relationship surrounded by external structure including one or more fluid ports between the two grooves/seals. Pressurized fluid (e.g., oil) is introduced via the ports. The fluid in the damping chamber formed between the grooves/seals maintains a fluid film in the region between the grooves. This thin film (the "squeeze film") provides small amounts of displacement and damping. The natural frequency of the system is a function of the effective mass of the system, spring rate, and the squeeze-film damping. The presence of the two grooves and seals renders the configuration a "closed damper" configuration (although there will be small amounts of leakage past the seals).

A more complex configuration of squirrel cage is shown in U.S. Patent Application Publication No. 2017/0122369A1 (the '369 publication) of Smedresman et al., May 4, 2017, the disclosure of which is incorporated by reference in its entirety herein as if set forth at length. The '369 publication has a retainer wherein the first end portion also engages the outer race of a different bearing. In the '369 publication configuration, the forward portion of the retainer has a fluid damping relationship with the outer race of the associated bearing in a similar way as the static structure has to the second end portion of the retainer of the '669 patent.

Yet other variations are more complicated and have more convoluted cross-sectional profiles. For example, whereas the aforementioned examples have the squirrel cage center portion extending close to straight axially between two axial end portions, other configurations having jogs or zigzags in their axial cross-section are possible. Several such variations are variations disclosed in U.S. Patent Application Publication No. 2015/0240867A1 (the '867 publication) of Amador et al., Aug. 27, 2015, the disclosure of which is incorporated by reference in its entirety herein as if set forth at length.

A further zigzag configuration is shown in U.S. Patent Application Publication 2016/0186607A1 (the '607 publication) of Witlicki et al., Jun. 30, 2016, the disclosure of which is incorporated by reference in its entirety herein as if set forth at length where a two-piece spring/damper is created by having a squirrel cage spring extending axially between one axial end portion and a second axial end portion of that spring. However, the damper is formed along a second piece having a first axial end mounted to the second axial end of the spring and having a body extending axially back towards the spring first end portion to join a second end portion bearing the grooves for the seals for the damper. Thus, the first end portion of the spring which serves for mounting may be axially very close to the second end portion of the second piece which bears the damping features. Depending upon the situation, the second piece may itself have a squirrel cage spring construction or may be relatively rigid.

A similar damper configuration is the "open damper" which lacks the two grooves/seals. See, Bugra H. Ertas et al., "Synchronous Response to Rotor Imbalance Using a Damped Gas Bearing", J. Eng. Gas Turbines Power, 132(3), 032501, Dec. 1, 2009, The American Society of Mechanical Engineers, New York, N.Y. Such a configuration allows escape of fluid from the gap between spring and static structure. A greater supply of fluid will be required in an open damper relative to a similar closed damper and the configuration will have different damping characteristics.

SUMMARY

One aspect of the disclosure involves a machine comprising: a first member; a second member; a bearing having an inner race mounted to the second member and an outer race; and a spring. The spring comprises: a first end portion mounted to the first member; a second end portion, the bearing outer race mounted to the second end portion; and a flexible portion between the first end portion and the second end portion. The machine further comprises: an outer diameter first groove in an outer diameter surface of the second end portion; a first annular seal carried by the first groove and sealing with an inner diameter surface of a sealing portion of the first member; an inner diameter second groove in the first member; a second annular seal carried by the second groove and sealing with an outer diameter surface of the second end portion; and a fluid outlet in the first member to a chamber between the first annular seal and the second annular seal.

A further embodiment of any of the foregoing embodiments may additionally and/or alternatively include the first annular seal being cast iron and the second annular seal being steel.

A further embodiment of any of the foregoing embodiments may additionally and/or alternatively include a wave spring between the second annular seal and a radially-extending face of the second groove.

A further embodiment of any of the foregoing embodiments may additionally and/or alternatively include there being only a single outer diameter groove in the outer diameter surface of the second end portion.

A further embodiment of any of the foregoing embodiments may additionally and/or alternatively include: the spring comprising a first piece and a second piece; the first end portion being a first end portion of the first piece; the second end portion being a second end portion of the second piece; the first piece having a second end portion; and the second piece having a first end portion fastened to the second end portion of the first piece.

A further embodiment of any of the foregoing embodiments may additionally and/or alternatively include the flexible portion being a flexible portion of the first piece between the first piece first end portion and the first piece second end portion.

A further embodiment of any of the foregoing embodiments may additionally and/or alternatively include the flexible portion comprising a circumferential array of longitudinal beams.

A further embodiment of any of the foregoing embodiments may additionally and/or alternatively include the first end portion, the second end portion, and the flexible portion being of a single metallic piece.

A further embodiment of any of the foregoing embodiments may additionally and/or alternatively include the first end portion comprising a radially outwardly protruding mounting flange having a plurality of mounting holes.

A further embodiment of any of the foregoing embodiments may additionally and/or alternatively include the flexible portion comprising at least one of steel and titanium alloy.

A further embodiment of any of the foregoing embodiments may additionally and/or alternatively include the first seal being under hoop compression and the second seal being under hoop tension.

A further embodiment of any of the foregoing embodiments may additionally and/or alternatively include the machine being a gas turbine engine.

A further embodiment of any of the foregoing embodiments may additionally and/or alternatively include a method for using the machine. The method comprises introducing a fluid to a radial clearance between the second end portion and the inner diameter surface of the sealing portion.

A further embodiment of any of the foregoing embodiments may additionally and/or alternatively include the fluid biasing: the second annular seal against a side of the second groove; and the first annular seal against a side of the first groove.

Another aspect of the disclosure involves a machine comprising: a first member; a bearing; and a bearing spring support/damping apparatus. The bearing spring support/damping apparatus comprises: a first end portion; a second end portion having an inner surface mounting the bearing and an outer surface radially inward of an inner surface of the first member; and a flexible portion between the first end portion and the second end portion. A first seal seals between the outer surface of the second end portion and the inner surface of the first member to a first axial side of a fluid outlet in the inner surface of the first member. A second seal seals between the second end portion and a radial face of the first member to a second axial side of the fluid outlet axially opposite the first axial side to form a damper.

A further embodiment of any of the foregoing embodiments may additionally and/or alternatively include the second seal being partially in a radially inwardly open groove of the first member.

A further embodiment of any of the foregoing embodiments may additionally and/or alternatively include the radial face being a surface of a side of the radially inwardly open groove of the first member.

A further embodiment of any of the foregoing embodiments may additionally and/or alternatively include the first seal being under hoop compression and the second seal being under hoop tension.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 2 is a view of a spring piece of the centering spring/damper of FIG. 1A.

FIG. 3 is a view of a damper piece of the centering spring/damper of FIG. 1A.

Like reference numbers and designations in the various drawings indicate like elements.

DETAILED DESCRIPTION

An initial example of a spring/damper is disclosed as a modification of one of the aforementioned two-piece zigzag section spring/dampers. The identification of two pieces does not mean only two pieces but rather two main pieces. As is discussed below, there are additional fasteners and the like involved.

Figure 1:
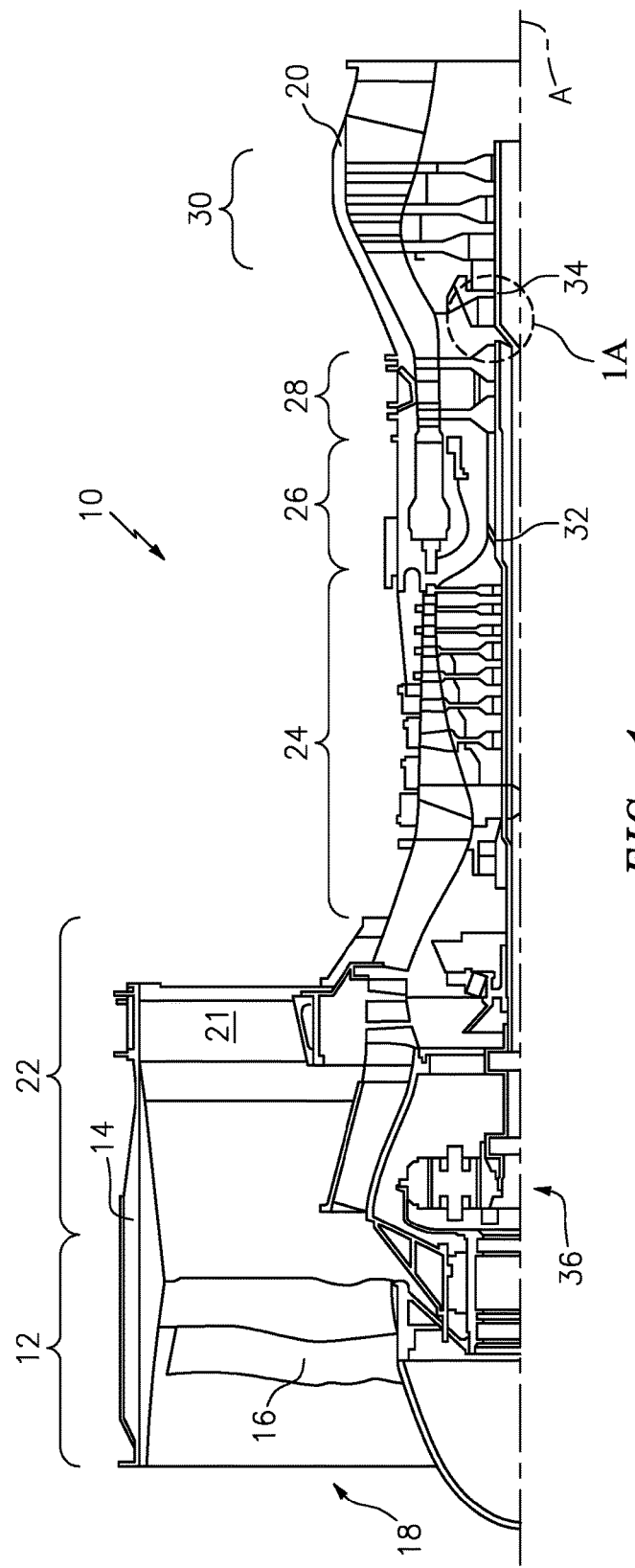
FIG. 1 is a simplified central axial sectional half view of a gas turbine engine.

FIG. 1 shows an exemplary simplified gas turbine engine 10 taken from U.S. Patent Application Publication 20110286836 (the '836 patent) of Davis, Nov. 24, 2011, the disclosure of which is incorporated herein by reference as if set forth at length. Engine 10 includes a fan section 12 within a fan case 14. The fan section 12 includes multiple blades at an inlet 18 of the fan case 14. A core 20 is supported relative to the fan case 14 such as by flow exit guide vanes 21. The core 20 includes a low pressure compressor section 22, a high pressure compressor section 24, a combustor section 26, a high pressure turbine section 28 and a low pressure turbine section 30. In one example, the blades of the low pressure compressor section 22 and low pressure turbine section 30 are supported on a low spool 34 rotatable about an axis A. An epicyclic fan drive gear system (FDGS) 36 couples the low spool rotor to the fan shaft to drive the fan. The blades of the high pressure compressor section 24 and high pressure turbine section 28 are supported on a high spool 32 rotatable about the axis A.

Figure 1A:
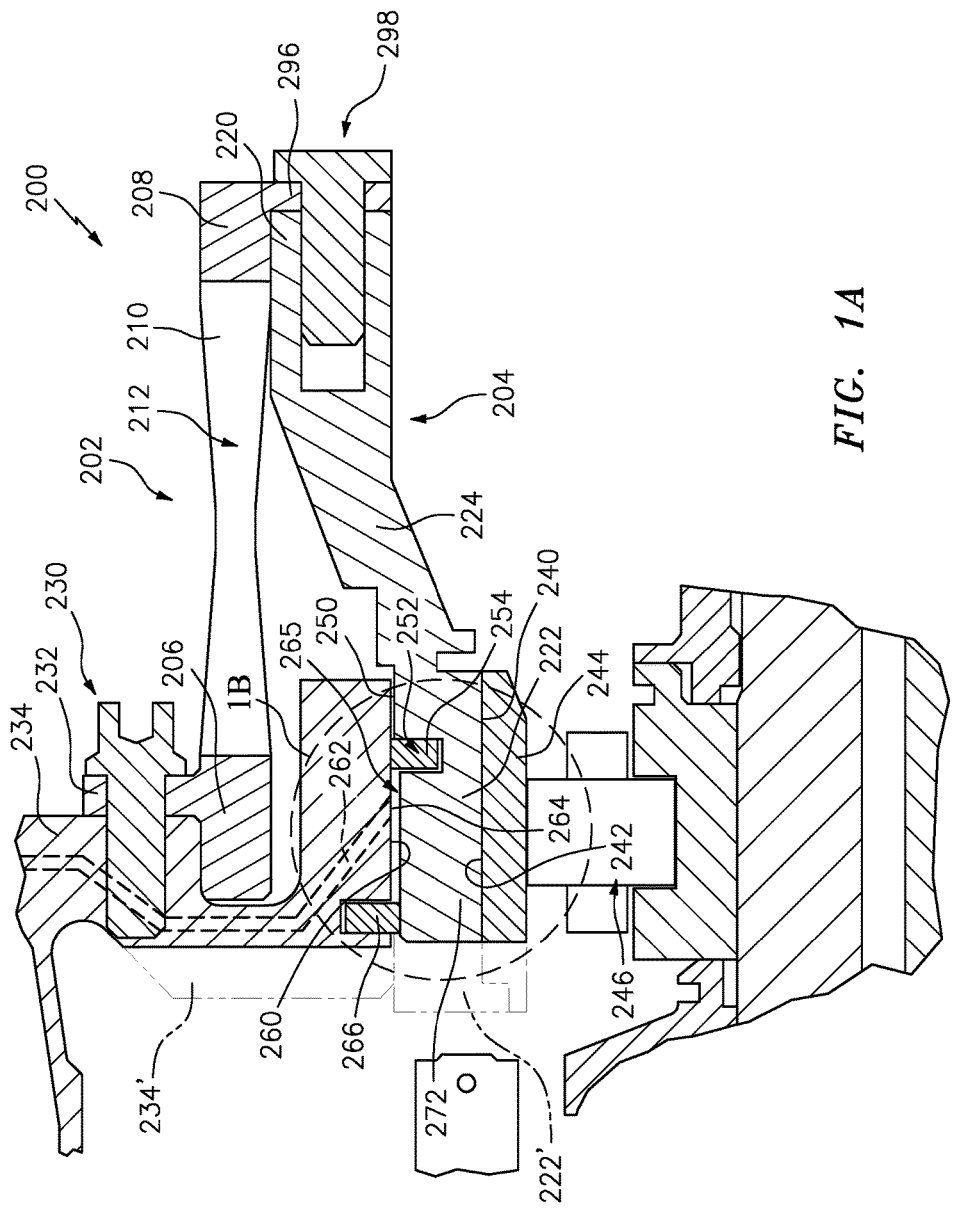
FIG. 1A is an enlarged view of a bearing area of the engine of FIG. 1.

FIG. 1A shows one of the main bearings of the engine. FIG. 1A specifically shows a spring/damper system 200 having a first piece 202 (also FIG. 2) and a second piece 204 (also FIG. 3). The first piece has a first annular end portion 206 (FIG. 1A) and an axially opposite second axial end portion 208. In between, a squirrel cage spring portion is formed by legs 210 and associated gaps 212. The second piece 204 comprises a first end portion 220 and a second end portion 222. An intermediate portion 224 extends between the end portions 220 and 222 and may be full annulus or segmented or may otherwise have apertures (see '607 publication) such as for passing fluid lines (e.g., for bearing lubricant) and the like. In the exemplary embodiment, the second piece 204 is relatively rigid compared to the flexibility offered the first piece by its squirrel cage legs 210. As is discussed further below, the first piece first end portion 206 is a proximal portion mounted to static engine structure (e.g., the case) such as via an array of fasteners 230 (e.g., screws) extending through a flange 232 of the first end portion 206 and into an associated flange 234 of the supporting structure (e.g. grounded to/integral with the case in this example).

The second piece 204 second end portion 222 is a distal portion having an inner diameter (ID) face 240 engaging and receiving the outer diameter (OD) face 242 of the outer race 244 of the rolling element bearing 246. The inner diameter (ID) race of the bearing 246 may be mounted to the outer diameter (OD) surface of a shaft.

The outer diameter (OD) surface 250 (FIG. 1A) of the second end portion 222 bears a groove 252 carrying a seal 254 (as discussed above). The exemplary seal has an inner diameter (ID) or radially-inboard surface 255 (FIG. 1B) and outer diameter (OD) or radially outboard surface 256. The seal has a first axial end surface or face (axial facing but radially extending) 257 and an opposite second axial end surface 258. The seal OD surface 256 engages the inner diameter (ID) surface 260 of a portion of the static structure. A fluid passageway 262 in the static structure has an outlet 264 to the surface 260 ahead of the seal 254.

As is so-far described, the system represents one example of a baseline system. However, the baseline system also has the second groove/seal discussed above so that the two grooves/seals define a closed damper damping chamber 265 axially spanning/surrounding the port 264 from the passageway 262. The FIG. 1A embodiment replaces that outwardly open second groove and seal. Instead, there is second seal 266 carried in a radially inwardly open groove (inner diameter (ID) groove) or channel 268 in the structure 234 at an opposite axial end of the chamber 265 from the seal 254.

The groove 268 has sidewalls having respective axial facing or radially extending radial faces 286 and 287 and has a radially outboard base surface 288. The second seal 266 seals with the surface 250. Fluid pressure in the chamber 265 axially biases the second seal 266 into engagement with the associated end surface (face 287) of the groove.

The second seal 266 may be made of a conventional seal material. Particular examples are discussed below. The exemplary second seal has an inner diameter (ID) or radially-inboard surface 282 and outer diameter (OD) or radially outboard surface 283. The exemplary ID surface 282 contacts the surface 250. The OD surface 283 is, however, radially spaced apart from the OD base surface 288 of the groove 268.

Figure 1B:
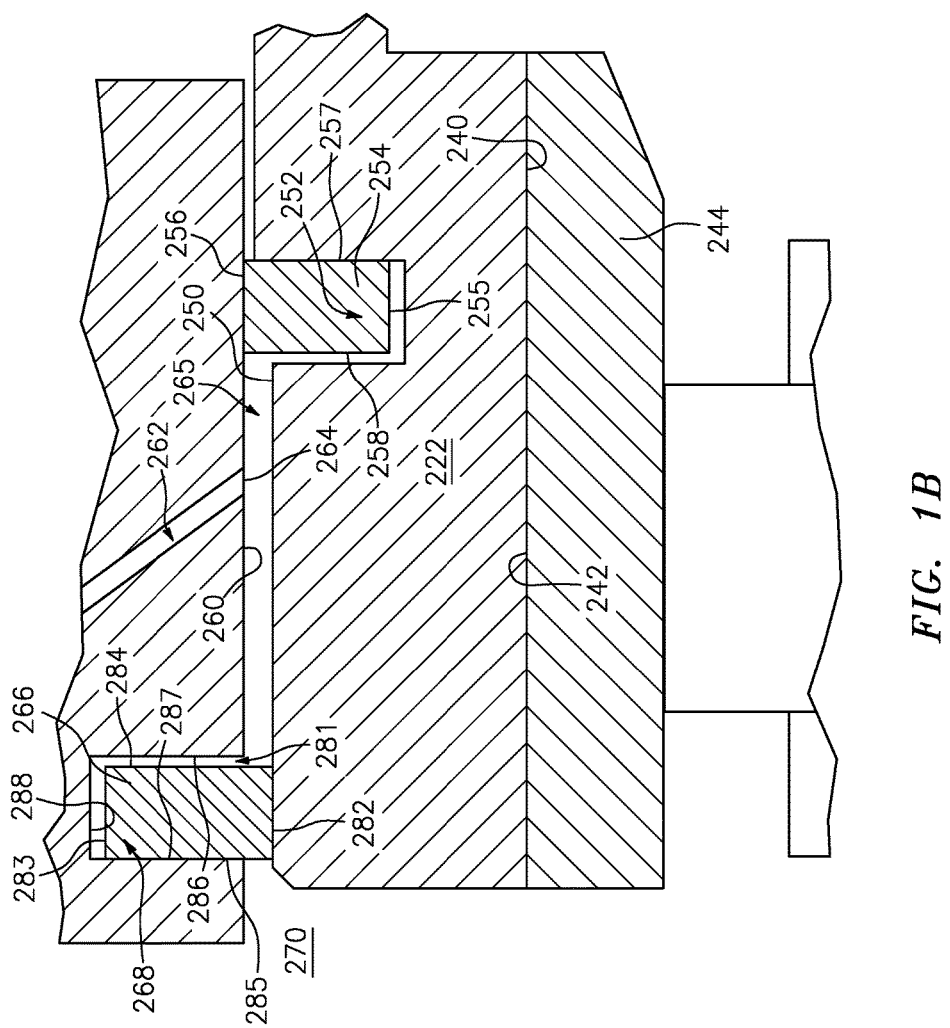
FIG. 1B is a further enlarged view of a damper of the bearing area of FIG. 1A.

FIG. 1B further shows the second seal 266 as having a first axial end surface 284 and an opposite second axial end surface 285. In operation, the surface 284 is spaced slightly apart from the adjacent face 286 of the groove 268 to create a gap 281 extending radially outward from the damping chamber 265 between seal face 284 and groove face 286. The gap 281 allows pressure from the fluid (oil) exiting the passageway 262 outlet 264 into the groove 268 to bias the second seal into engagement with the groove end face 287 This axial bias is caused by the pressure in the damping chamber 265 being greater than the pressure an adjacent external space 270.

Figure 6:
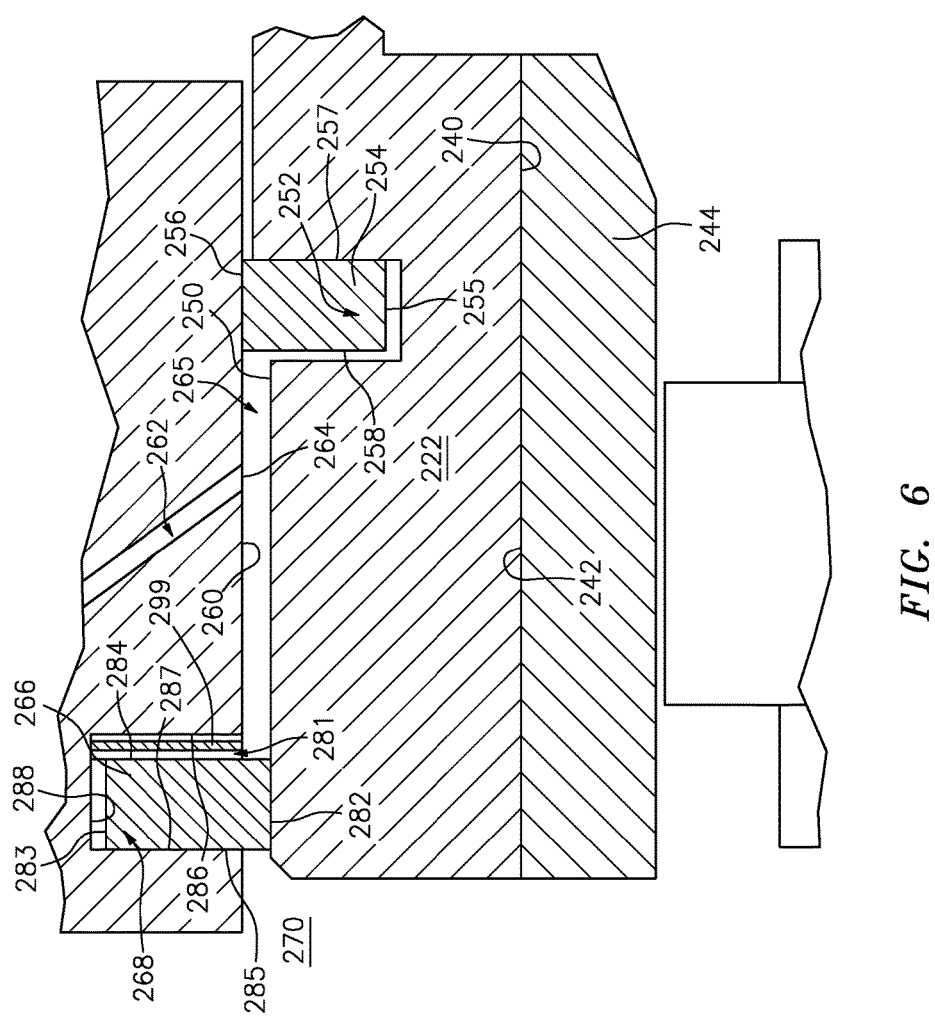
FIG. 6 is a view of the FIG. 1B damper area with an added wave spring.

Further variations may replace or augment this axial bias with axial spring bias. For example, a metallic wave spring 299 (FIG. 6) in the gap 281 may add axial bias while still exposing the face 284 to the chamber 265 fluid pressure. The illustrated spring is a single-turn wave spring (closed or open). Alternative wave springs are multi-turn or stacked wave springs. The wave spring's added axial bias provides a preload against binding so as to ensure the seal seats against the surface 287 to, in turn, allow the fluid pressure to further increase engagement force between the seal and surface 287.

The exemplary seals are configured having a symmetric central axial half section (e.g., rectangular) However, one or both seals may be otherwise configured such as is configured so that the contact area between the seal and the channel sidewall face is over only a small portion of the radial span of the seal (radial span between ID surface and OD surface). This may be achieved by forming the seal with an axial protrusion having a radial span of less than half of the radial span between seal ID and OD surfaces, more particularly 15% to 30%.

Unlike the seal 254 being in sliding contact with the surface 260 and having a gap relative to its slot's 252 ID base, there is a radial gap between the OD surface 283 of second seal 266 and its slot's OD base 288. The second seal may thus be in hoop tension that provides at least a sliding slight compressive engagement between the seal ID surface 282 and the surface 250. Thus, there may be further differences between the two seals (beyond the mere fact that the second seal seals axially with the static structure).

One such difference is the hoop stress. Whereas the second seal may be in slight hoop tension, the first seal may be in slight hoop compression. There may be associated materials differences due to such stress. For example, the second seal 266 may have material chosen to be better under tension (one with higher LCF stress and/or creep margin). For example, the first seal might be a cast iron while the second seal is a steel (e.g., stainless) which may have better tensile properties.

Similarly, the material of the second seal 266 may be chosen for greater flexibility in axial section. This might be particularly relevant where there is binding at the seal ID surface.

Also, the ID surface 282 may be polished for smoothness and low friction and/or formed by an anti-friction coating on the steel or iron substrate of the seal 266 to prevent binding and allow the seal to axially slide. For example, the coating might be a hard face coating such as titanium nitride or a diamond-like coating (e.g., diamond-like carbon (DLC) or diamond-like nanocomposite (DLN)) applied such as by flame spray, plasma spray, or vapor deposition.

The elimination of the second radially outwardly open groove (and associated seal) relative to the baseline allows reduction in the axial length of the end portion 222 which may, in turn, allow reduction in the axial length of the engine. For example, FIG. 1A shows, in broken line, the extent of a baseline structure 234' and baseline retainer distal portion 222'. These protrude substantially beyond the revised corresponding portions 234 and 222. The saved space may be utilized in a further modification to shorten the engine, shifting the portion 234 forward relative to the structure immediately ahead of it.

At least for a mid-thrust gas turbine engine, exemplary centered radial clearance of gap 265 is from greater than zero to 20 mils (0.5 mm) (e.g. (1.0 mil to 20 mils (25 micrometer to 0.5 mm) or 5.0 mils to 20.0 mils (0.13 mm to 0.5 mm) or 5.0 mils to 10.0 mils (0.13 mm to 0.25 mm)).

FIG. 1A additionally shows the mounting of the two pieces to each other. In this example, the second end portion 208 of the first piece 202 has a flange 296 having a hole circle. The forward face of the flange 296 abuts the aft face of the first end portion 220 of the second piece 204. The first end portion 220 has a circle of threaded bores complementary to the holes of the flange to respectively receive threaded fasteners 298 (e.g., screws) to secure the two together.

Figure 4:
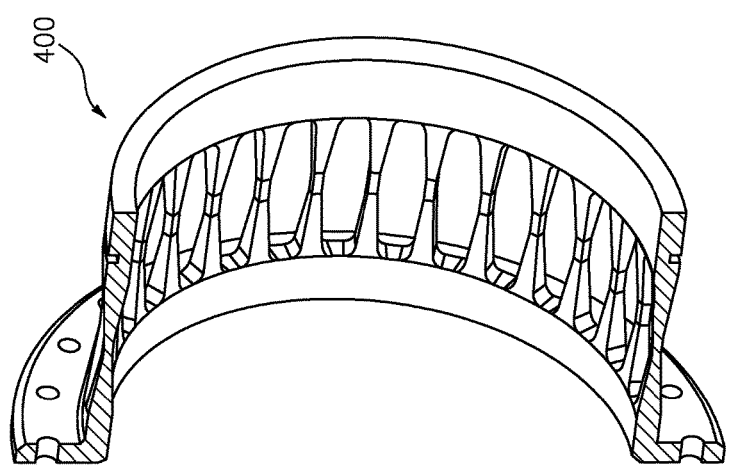
FIG. 4 is a view of an alternative single-piece spring/damper.
Figure 5:
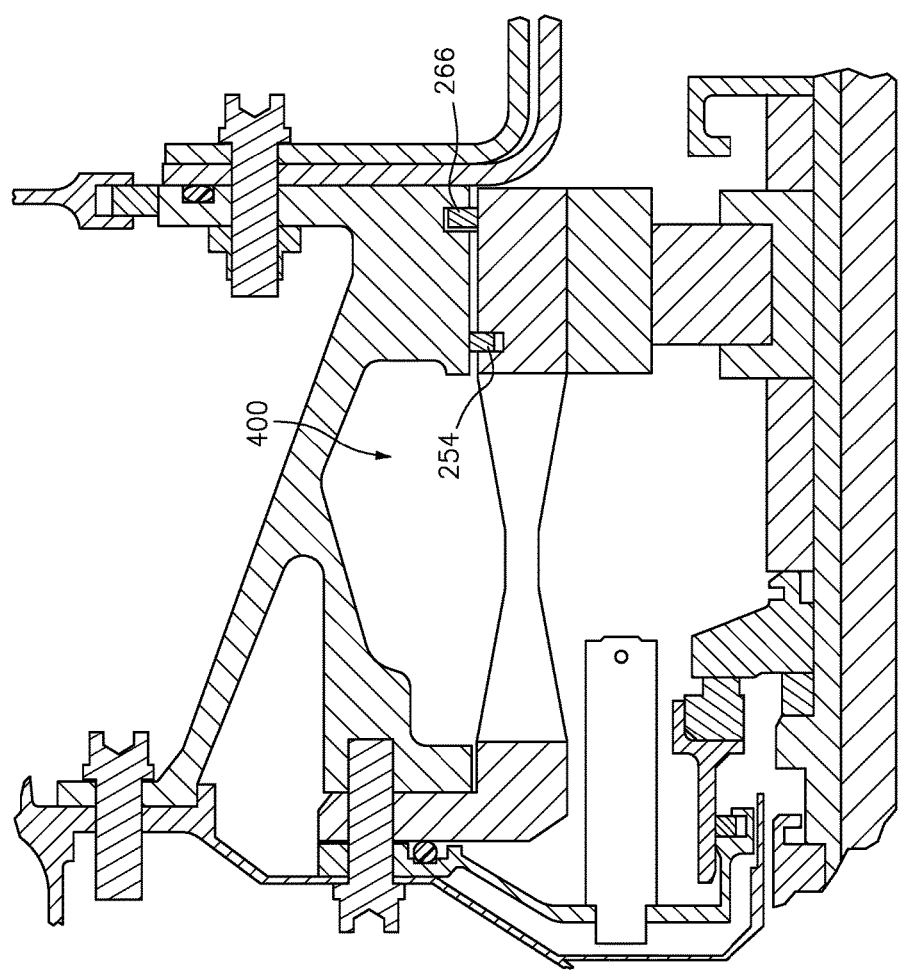
FIG. 5 is a partial central axial sectional view of the FIG. 4 spring/damper in an engine.

FIG. 4 shows a single-piece spring/damper 400 such as may be used in systems such as the '669 publication (see, also, configuration illustrated, but not discussed, in U.S. Pat. No. 8,439,637). FIG. 5 shows the spring/damper 400 installed in an engine with similar interfaces to similar features to that of the spring/damper of FIG. 1A.

Accordingly, it is seen that when implemented as a modification of a baseline (e.g., prior art such as those referenced above) configuration, the foregoing teachings may be implemented at various levels. A first order modification is simply to remove one of the two radially outwardly open channels/grooves while leaving the other and adding the radially inwardly open groove and its seal.

There may be many second order or beyond modifications. For example, one such modification involves shortening the distal end portion.

Another second order modification involves lengthening the legs/beams. For example the beam increase may partially offset the decrease in distal end portion 222 length (and is thus particularly relevant in single-piece constructions). Lengthening the beams may reduce their strains at a given deflection of the distal end portion and thus may reduce stress and improves service life. Lengthened beams may be thickened to maintain spring rate.

Another second order modification involves repositioning the remaining groove 252 and its seal 254. For example, one might shift the groove to maintain length of the squeeze film. This might involve shifting the remaining groove toward the distal end. In such a case, this opens up further ability to lengthen the beam and gaps (see discussion immediately above) to further optimize spring performance. Third order modifications involve making use of the longitudinal space savings and modifying adjacent structure or even shortening the engine overall.

Manufacture may be by conventional materials and techniques (e.g., machining the spring and damper piece or pieces from alloys such as steels or titanium alloys such as on a lathe followed by slot machining and hole drilling/tapping in a rotary fixture). Alternatively, one or more of the pieces may be made by additive manufacture techniques (e.g., electron beam melting (EBM) or direct metal laser sintering (DMLS)).

Further variations include alternative mounting means for mounting the spring (e.g., relative to engine static structure). Alternatives to the circumferential array of fastener holes in a flange include securing the proximal end portion via a large nut circumscribing the engine axis or welding the proximal end portion to the static structure. Among further variations are springs where the legs are separately formed from the end portions they are then secured to.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A machine comprising:
a first member;
a second member;
a bearing having an inner race mounted to the second member and an outer race; and
a spring comprising:
a first end portion mounted to the first member;
a second end portion, the bearing outer race mounted to the second end portion; and
a flexible portion between the first end portion and the second end portion, and further comprising:
an outer diameter first groove in an outer diameter surface of the second end portion;
a first annular seal carried by the first groove and sealing with an inner diameter surface of a sealing portion of the first member;
an inner diameter second groove in the first member;
a second annular seal carried by the second groove and sealing with an outer diameter surface of the second end portion; and
a fluid outlet in the first member to a chamber between the first annular seal and the second annular seal.

2. The machine of claim 1 wherein:
the first annular seal is cast iron; and
the second annular seal is steel.

3. The machine of claim 1 further comprising:
a wave spring between the second annular seal and a radially-extending face of the second groove.

4. The machine of claim 1 wherein:
there is only a single outer diameter groove in the outer diameter surface of the second end portion.

5. The machine of claim 1 wherein:
the spring comprises a first piece and a second piece;
the first end portion is a first end portion of the first piece;
the second end portion is a second end portion of the second piece;

the first piece has a second end portion; and the second piece has a first end portion fastened to the second end portion of the first piece.

6. The machine of claim 5 wherein:

the flexible portion is a flexible portion of the first piece between the first piece first end portion and the first piece second end portion.

7. The machine of claim 1 wherein:

the flexible portion comprises a circumferential array of longitudinal beams.

8. The apparatus of claim 1 wherein:

the first end portion, the second end portion, and the flexible portion are of a single metallic piece.

9. The apparatus of claim 1 wherein:

the first end portion comprises a radially outwardly protruding mounting flange having a plurality of mounting holes.

10. The apparatus of claim 1 wherein:

the flexible portion comprises at least one of steel and titanium alloy.

11. The machine of claim 1 wherein:

the first seal is under hoop compression; and the second seal is under hoop tension.

12. The machine of claim 1 being a gas turbine engine.

13. A method for using the machine of claim 1, the method comprising:

introducing a fluid to a radial clearance between the second end portion and the inner diameter surface of the sealing portion.

14. The method of claim 13 wherein the fluid biases:

the second annular seal against a side of the second groove; and the first annular seal against a side of the first groove.

15. A machine comprising:

a first member;

a bearing;

a bearing spring support/damping apparatus comprising:

a first end portion;

a second end portion having an inner surface mounting the bearing and an outer surface radially inward of an inner surface of the first member; and a flexible portion between the first end portion and the second end portion, wherein:

a first seal seals between the outer surface of the second end portion and the inner surface of the first member to a first axial side of a fluid outlet in the inner surface of the first member; and a second seal seals between the second end portion and an axially facing radial face of the first member to a second axial side of the fluid outlet axially opposite the first axial side to form a damper.

16. A machine comprising:

a first member;

a bearing;

a bearing spring support/damping apparatus comprising:

a first end portion;

a second end portion having an inner surface mounting the bearing and an outer surface radially inward of an inner surface of the first member; and a flexible portion between the first end portion and the second end portion, wherein:

a first seal seals between the outer surface of the second end portion and the inner surface of the first member to a first axial side of a fluid outlet in the inner surface of the first member;

a second seal seals between the second end portion and a radial face of the first member to a second axial side of the fluid outlet axially opposite the first axial side to form a damper; and the second seal is partially in a radially inwardly open groove of the first member.

17. The machine of claim 16 wherein:

the radial face is a surface of a side of the radially inwardly open groove of the first member.

18. The machine of claim 16 wherein:

the first seal is under hoop compression; and the second seal is under hoop tension.

* * * * *